United States Patent [19]

Bendell et al.

[11] Patent Number: 4,587,563
[45] Date of Patent: May 6, 1986

[54] COOLER CONTROL FOR A SOLID-STATE IMAGER CAMERA

[75] Inventors: Sidney L. Bendell, Sequin, Wash.; Theodore D. Michaelis, Medford Township, Burlington County, N.J.

[73] Assignee: RCA Corporation, Princeton, N.J.

[21] Appl. No.: 655,675

[22] Filed: Sep. 28, 1984

[51] Int. Cl.⁴ ............................................... H04N 5/16
[52] U.S. Cl. .................................... 358/213; 358/221; 62/3; 62/190; 62/259.2
[58] Field of Search ............... 358/213, 221, 211, 212; 62/3, 190, 259.2

[56] References Cited

U.S. PATENT DOCUMENTS 4,467,611  8/1984  Nelson et al. .......................... 62/3
4,525,743  6/1985  Wood, Jr. ............................ 358/221

Primary Examiner—Gene Z. Rubinson
Assistant Examiner—L. C. Schroeder
Attorney, Agent, or Firm—Eugene M. Whitacre; Peter M. Emanuel; Lawrence C. Edelman

[57] ABSTRACT

A camera including a solid-state imager has a cooler for controlling cooling of the imager. A thermal servo regulates the cooling of the imager to a set point. A cooling control means changes the cooling set point in response to changes in the sensitivity of the camera.

17 Claims, 5 Drawing Figures

COOLER CONTROL FOR A SOLID-STATE IMAGER CAMERA

BACKGROUND OF THE INVENTION

This invention relates to a camera including a solid-state imager which is cooled for reducing temperature-dependent noise and dark current while minimizing power consumption of the cooler.

Portable television cameras having solid-state imagers are now appearing in the marketplace. These cameras are very advantageous, particularly as portable cameras, in that they are extremely rugged, small, consume little power and their imagers tend not to degrade with age. However, they do have certain disadvantages when compared with cameras having conventional pick-up tubes. One disadvantage is the generation of unwanted non-image representative signal components, such as noise and high levels of leakage currents, due to properties unique to solid-state imagers. These properties cause temperature-dependent, and spatially non-uniform black-level leakage currents to appear as signal even in the absence of light, i.e., dark currents. The non-uniformity of the dark currents results in black level shading and/or a color shifting of the subsequently reproduced image. The problem of noise due to temperature-dependent sources and the spatially non-uniform dark currents is exacerbated by the power dissipated in the imager and its support circuitry during operation, which may cause a temperature rise of the imager of perhaps 30° C. above the ambient air temperature outside the camera.

Unwanted temperature-dependent non-image representative signal components, such as noise and dark current, increase with temperature increases. Furthermore, when operating the camera in low illumination scenes, the amount of light reaching the imager may be reduced from a preferred level and result in a reduced level of image-representative signal being supplied from the imager. Thus, although a camera including solid-state imagers may provide good noise performance and black level shading when operating at room temperature under ordinary lighting conditions, the noise performance and black level shading may not be satisfactory under low light level conditions, such as may be experienced when televising night scenes or indoor scenes under ambient lighting. Consequently, it is desirable to cool a solid-state imager to reduce the level of temperature-dependent noise and dark currents in its output signal when the camera is operated in scenes having low illumination, so that satisfactory signal-to-noise ratio (S/N) and low black level shading is obtained for the imager output signal. The cooling may be accomplished by a thermoelectric cooler, which may be a solid-state device through which current is passed in order to pump thermal energy away from a cooled surface in accordance with the well-known Peltier phenomena. However, some of the advantages of the solid-state imager over the tube-type imager are lost when cooling is used e.g., the additional power required for the thermoelectric cooler increases the power drain on the power supply for the camera. Since a majority of solid-state imager cameras are portable and operated from batteries, the camera operating time between battery recharges is undesirably reduced due to the increased power drain of the cooler. If the thermoelectric cooler is constantly used to maintain the solid-state imager at a predetermined temperature, unnecessary power is utilized when the camera is operated under conditions wherein satisfactory signal-to-noise performance could be obtained with less or no cooling. It is therefore desirable to minimize the power drain caused by a thermoelectric cooler without noticeably sacrificing the S/N or black level uniformity performance of the camera.

SUMMARY OF THE INVENTION

In accordance with the present invention a cooling means is coupled to a solid-state imager for removing heat from the imager. A thermal servo is coupled to the cooling means for regulating the cooling of the imager to a predetermined point. A signal processing means including a gain-controlled amplifier develops a video signal from the output signals of the imager. A cooling control means coupled to the thermal servo changes the predetermined point of the thermal servo in accordance with changes in the gain of said gain-controlled amplifier.

DESCRIPTION OF THE INVENTION

Figure 1:
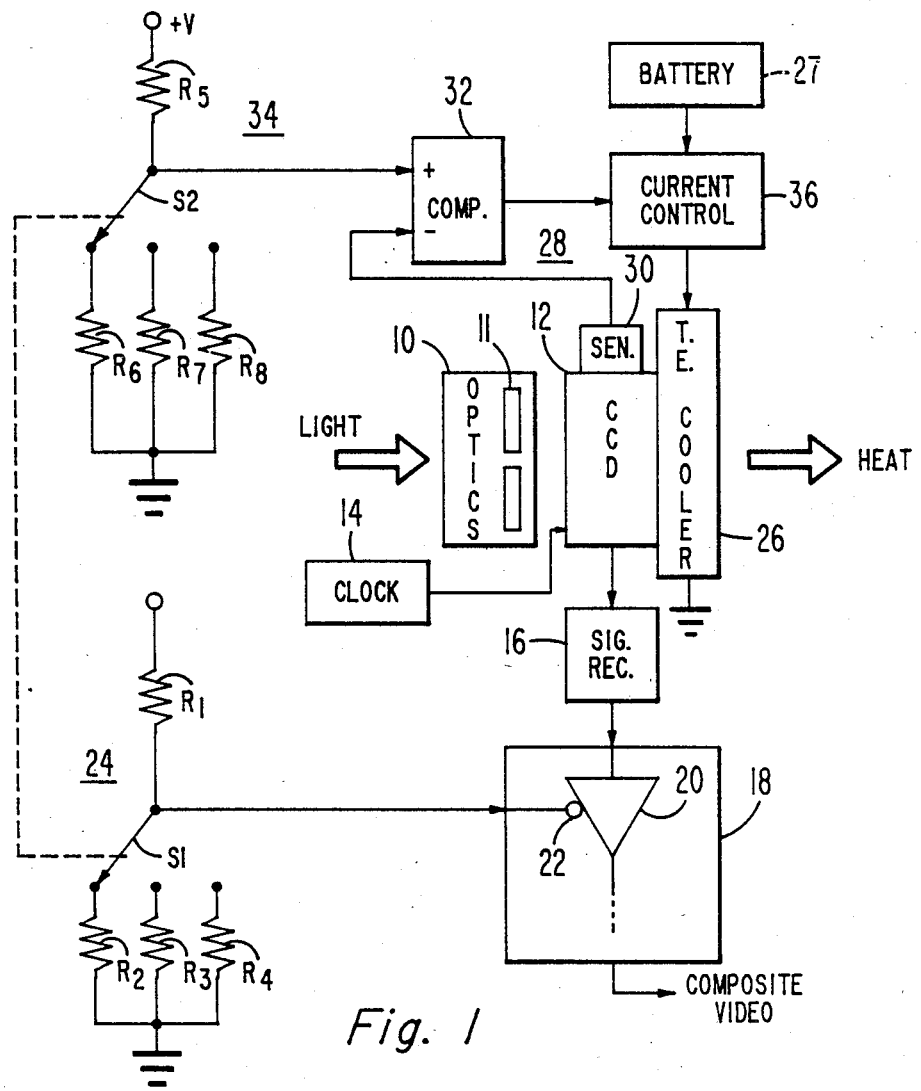
FIG. 1 is a block diagram of a solid-state imager camera including a thermal servo control apparatus constructed in accordance with the invention.

In FIG. 1, optics 10, including an iris 11 (and a lens and perhaps a prism or a rotating shutter, not shown) focuses a light image reflected from an illuminated scene (not shown) onto a solid-state imager 12. Iris 11 is controlled in a conventional manner (not shown) for controlling the amount of light reaching imager 12 to a preferred amount in spite of variations in scene illumination. Imager 12 may be a charged coupled device (CCD) imager of the well-known field-transfer type or other type of solid-state sensor, such as an MOS type. A clock generator 14 provides multiphase clock signals to imager 12 for controlling the generation of image-representative charges integrated within imager 12 and their transfer as output signals from imager 12 to a signal recovery circuit 16. Signal recovery circuit 16 develops image-representative analog signals from the charge samples supplied from imager 12 in accordance with one of several well-known signal recovery techniques, such as correlated double sampling. The analog signal supplied from signal recovery circuit 16 is applied to a signal processing circuit 18 which includes ordinary camera signal processing, circuitry for e.g., shading, dropout correction, gamma correction, clamping, blanking and the like in order to provide a composite color television signal, such as an NTSC signal, at its output.

Signal processing circuit 18 includes a preamplifier 20 at its input which has its gain selectively controlled to predetermined relative levels by a multi-position switch S1. Switch S1 corresponds to a sensitivity control for the camera of FIG. 1. The sensitivity of the camera is normally increased when scene illumination is so low that even if iris 11 were all the way opened, an amount of light reduced from the preferred amount reaches imager 12. For minimizing noise in the composite video signal which may be generated by signal recovery circuit 16 and preamplifier 20, it is desirable to operate preamplifier 20 at a preset relative gain of e.g., 0 dB. However, gains of e.g., 6 dB and 18 dB are provided for preamplifier 20 for increasing the sensitivity of the camera when a reduced amount of light reaches imager 12, e.g., when televising low illumination scenes. Preamplifier 20 includes a gain control input 22 for use in setting the various relative gains of preamplifier 20 in response to an applied gain control voltage level. The gain control voltage level is developed by a voltage divider 24 which includes a resistor R1 which is coupled from a stable voltage supply +V (provided from the camera battery) to the wiper arm of switch S1 and resistors $R_2$, $R_3$ and $R_4$ which are coupled from the 18, 6 and 0 dB gain positions, respectively, of switch S1 to a common reference source such as ground potential.

A thermoelectric cooler 26 is in thermal contact with imager 12. Cooler 26 may be of the well-known Peltier type which pumps heat away from a cooled surface when energized by a direct current. Direct current for energizing cooler 26 is derived from the camera battery 27. The amount of direct current being applied is regulated by a thermal servo 28. Servo 28 comprises a temperature sensor 30 thermally coupled with imager 12 for providing a signal indicative of the temperature of imager 12 to the inverting input of a comparator 32. An adjustable voltage divider 34 comprising resistors R5, R6, R7 and R8 and a multi-position switch S2, arranged in similar fashion to gain adjusting arrangement 24, provides a reference signal to the non-inverting input of comparator 32. The level of the reference signal establishes a predetermined temperature set point to which servo 28 will regulate the cooling of imager 12. More specifically, whenever the level of the temperature indicating signal from sensor 30 indicates the imager temperature is above the set point, comparator 32 provides a command signal to a control input of a current control 36, which allows direct current from camera battery 27 to be applied for energizing cooler 26. After cooler 26 has reduced the temperature of imager 12 to the point wherein the level of the temperature indicating signal from sensor 30 is within a predetermined range from the reference signal, indicating that the temperature of imager 12 has reached the predetermined set temperature, comparator 32 causes the level of the command signal to change to a level which causes control 36 to de-energize cooler 26. An example of a commercially available thermoelectric cooler which may be used with this invention is the Melcor "Frigichip" (a registered trademark of Melcor) miniature ceramic module No. FC0.6-66-06L.

It has been recognized by the present inventor that when the camera is operating under normal light conditions, such as well-lit indoor scenes or outdoor daylight scenes, the amount of light reaching the imager is such that the imager supplied signals may have a satisfactory signal-to-noise ratio (i.e., a low enough non-image representative noise and dark current with respect to image representative signal current) without any imager cooling. However, as previously noted, when operating the camera at night or in dimmly lit areas, cooling of the imager may be necessary to reduce temperature-dependent non-image representative noise and dark current for obtaining a satisfactory signal-to-noise performance. Unnecessary cooling of the imager is disadvantageous, especially in a portable camera, since it requires battery power and therefore shortens the portable operating time of the camera. In accordance with the invention, the regulating point of the thermal servo for cooling the imager is changed in accordance with changes in the amount of light reaching the imager which necessitates a change in the sensitivity setting of the camera. Thus, in FIG. 1, the wiper arm of switch S2 is ganged to operate in unison with the position of switch S1 (as indicated by the dashed line) so that the level of the reference signal changes concurrently with changes in the gain setting for preamplifier 20. Since in practice, preamplifer 20 is desirably operated at the lowest relative gain setting (i.e., 0 dB) for best signal-to-noise performance, the higher gain positions, i.e., 6 dB and 18 dB are only used when operating the camera in areas having relatively low scene illumination. When scene illumination is low, the image-representative signal supplied from imager 12 is low and the level of the temperature dependent noise is an increased percentage of the signal, thus reducing the signal-to-noise performance of the camera.

More specifically, a signal-to-noise ratio of 65 dB at 560 lux provides satisfactory performance. At room temperature (approximately 23° C.), and low scene illumination levels of e.g., 70 lux, the S/N ratio of the imager output signal degrades by about 18 dB to about 47 dB. Reducing the temperature of imager 12 by about 32° C. reduces the level of the temperature-dependent noise and dark current by about 12 dB, such that satisfactory signal-to-noise performance can again be provided. Perhaps more importantly, lower dark current can reduce black level shading to the point where satisfactory camera performance is again provided. Consequently, when S1 is in the 18 dB gain position, switch S2 develops a level for the reference signal which regulates the cooling of imager 12 to a set point about 32° C. less than the set point at the 0 dB gain position. As scene illumination increases, the camera operator will successively operate switch S1 to lower gain settings for preamplifier 20 which causes, by way of switch S2, to successively increase the temperature set point to the temperature set point for 0 dB relative preamplifier gain e.g., 23° C.

In accordance with a further aspect of the invention, the energization and de-energization of cooler 26 in response to the command signal of thermal servo 28, is caused to occur during time periods when imager 12 is not supplying output signal which will be used in developing the composite video signal. This is desirable since energization and de-energization of cooler 26 may cause noise which could be picked up by imager 12 and undesirably contaminate its output signal. In a preferred embodiment, control 36 includes a means for synchronizing its control of power to cooler 26 to occur within the vertical blanking portion of a television field interval. Details of the synchronizing means will next be described in conjunction with FIG. 2.

Figure 2:
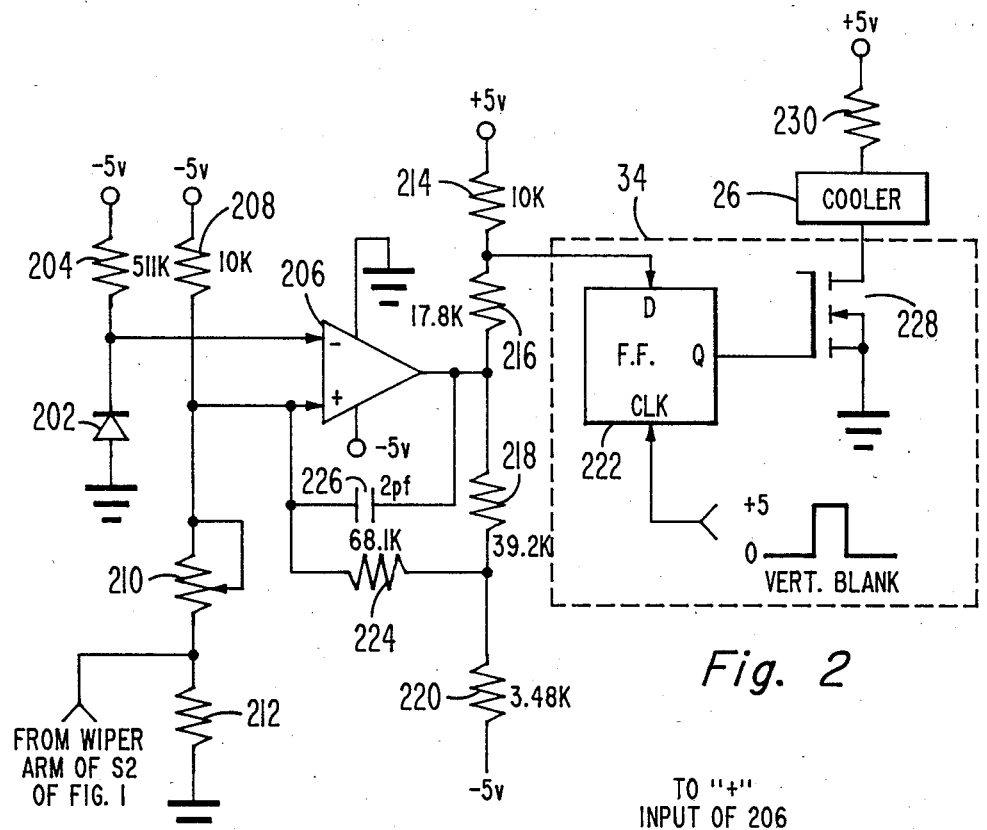
FIG. 2 is a detailed circuit diagram of a thermal servo control apparatus for cooling of the solid-state imager in the camera of FIG. 1.

FIG. 2 illustrates details of a preferred embodiment of thermal servo 28 of FIG. 1. A diode 202 (which may be integral with imager 12) is poled to be forward biased by a resistor 204 coupled to a −5 volt supply and provides at its cathode a voltage which, due to the constant current provided by resistor 204, changes in level in response to changes in temperature. The cathode of diode 202 is coupled to the inverting input of a comparator 206 of conventional design, such as an RCA CA32-

90A integrated circuit. A voltage divider network comprising resistors 208, 210 and 212 receives the temperature setting reference voltage at the wiper of switch S2 referred to in FIG. 1 at the junction between resistors 210 and 212. The voltage developed at the junction of resistors 208 and 210 of the divider is applied to the non-inverting input of comparator 206. Resistor 210 is adjusted during manufacture to take into account the actual voltage drop of diode 202 at room temperature and the voltage offset of comparator 206.

Comparator 206 changes the level of its output signal from a low to a high level and vice versa, in response to variations of the temperature sensitive voltage level developed by diode 202 about the reference voltage level at its non-inverting input. The wiper arm of switch S2 of FIG. 1, being coupled to the junction of resistors 210 and 212, attenuates the voltage level applied to the non-inverting input of comparator 206 so as to change the temperature set point of thermal servo 28 in response to changes in camera sensitivity, which are made to compensate for low light levels reaching imager 12, as previously described. A voltage shifting circuit comprising serially coupled resistors 214, 216, 218 and 220 coupled between +5 volts and −5 volts, receives the comparator output signal at the junction of resistors 216 and 218. Comparator 206 causes the voltage at this junction to vary between zero and −5 volts. Values for resistors 214-220 are as indicated in FIG. 2 for developing a high level signal of approximately +3.5 volts at the junction of resistors 214 and 216 when the output level of comparator 206 is at a high level of zero volts. The junction between resistors 214 and 216 provides the command signal to the data (D) input of a flip-flop 222. A positive feedback resistor 224 is coupled from the junction of resistors 218 and 220 for introducing a hysteresis into the operation of comparator 206 to prevent indeterminate comparator operation when the imager temperature is close to the temperature set point. The illustrated value for resistor 224 establishes approximately a 2° C. hysteresis. Capacitor 226 speeds up the operation of the hysteresis.

The output of flip-flop 222 is coupled to the gate electrode of an FET 228 having its drain connected to cooler 26 and its source electrode and substrate connected to ground. When the Q output is high, FET 228 is rendered conductive and current is supplied from the +5 volt source through a current limiting resistor 230 for energizing cooler 26. When the Q output is low, FET 228 is rendered non-conductive and cooler 26 is de-energized. Flip-flop 222 and FET 228 comprise controller 36 of FIG. 1, as indicated by the dashed lines in FIG. 2.

As previously noted, in accordance with an aspect of the invention, the operation of controller 36 is synchronized with the vertical blanking interval of a television field. Thus, the clock (CLK) input of flip-flop 222 receives a pulse having a high logic level timed to coincide with the vertical blanking interval. This pulse can be supplied from clock 14 of FIG. 1. Consequently, changes in the level of the Q output of flip-flop 222 are synchronized to occur at the leading edge of the CLK signal and therefore occur within the vertical blanking interval. This avoids the possibility of unwanted noise generated by the cooler energization and de-energization from effecting the imager output signal during the active trace portion of the television field.

Figure 3A:
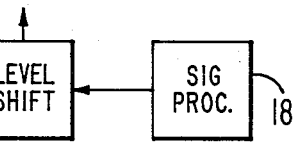
FIGS. 3a and 3b illustrate in block diagram form alternative thermal servo apparatus for use with the solid-state imager in the camera of FIG. 1.
Figure 3B:
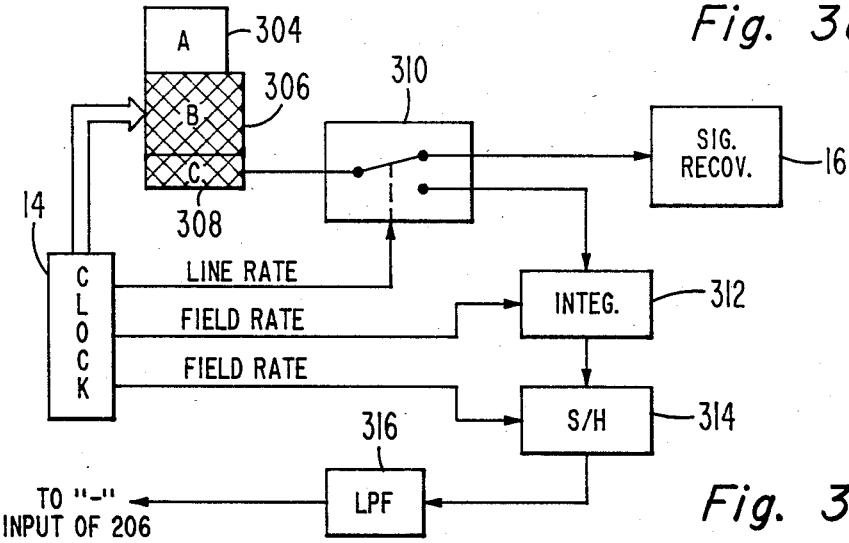

Means other than switch S2 and sensor 30 for developing the temperature set point and indicating signals, respectively can be used in thermal servo 28 and are described with respect to FIGS. 3a and 3b.

In FIG. 3a, an automatic gain control (AGC) signal, which automatically controls the gain of amplifier stages within signal processor 18 in response to changes in the amount of light reaching imager 12, is applied to a level shifting circuit 300 for providing the temperature set point signal to the non-inverting input of comparator 206 instead of the signal from the junction of resistors 208 and 210, as modified by the position of switch S2. Level shifting circuit 300 may simply comprise a resistor network for voltage shifting the AGC signal or may include several parallel connected diodes for establishing breakpoints in the amount or degree of level shifting, as well known to circuit designers.

Furthermore, although regulating the cooling of imager 12 has been described up to this point as regulation to a predetermined set temperature, since it is actually the level of temperature-dependent non-scene representative signal which is required to be controlled, this level can be sensed directly, rather than inferred by sensing temperature. For example, imager dark current can be directly sensed for providing the temperature indicating signal to the inverting input of comparator 206 of FIG. 2. This is shown in FIG. 3b.

In FIG. 3b a field transfer CCD imager 302, well known to those skilled in the art, is shown and includes a photosensitive imaging area 304 called the A register, a field storage area 306 called the B register and a line-sequential read-out register 308 called the C register. Briefly, a light-blocking mask, indicated by the cross-hatch shading, blocks B and C registers 306 and 308 from light so that only A register 304 develops a field of charges representative of the image. At the end of an image integration interval, such as 1/60 of a second, the charges developed in A register 304 are transferred to B register 306 so that A register 304 can integrate the next field of charges during the next 1/60 of a second interval. While the next field of charges are being integrated in A register 304, C register 308 sequentially reads-out from B register 306 each line of charges from the prior integrated field. The masked B register 308 is constructed to have an extra column of photosensitive imaging area which neither receives light due to the mask nor charge from A register 304 and thus any charge integrated in this extra area is representative of dark current only. A switch 310 is controlled by a TV line rate signal to pass image representative charges supplied from C register 308 to signal recovery circuit 16 while passing the charges originating from the extra photosensitive area which are representative of dark current only, to an integrating circuit 312. Integrator 312 integrates the dark current charges line-sequentially supplied during the field interval and is reset by a pulse from clock 14 to zero at the end of the field. Prior to being reset, a sample-and-hold circuit 314 samples the integrated dark current signal. A low pass filter 316 filters the output from sample-and-hold 314 to provide a signal having a level directly representative of the level of imager dark current to the inverting input of comparator 206 of FIG. 2 instead of the temperature indicating signal from diode 202.

Figure 4:
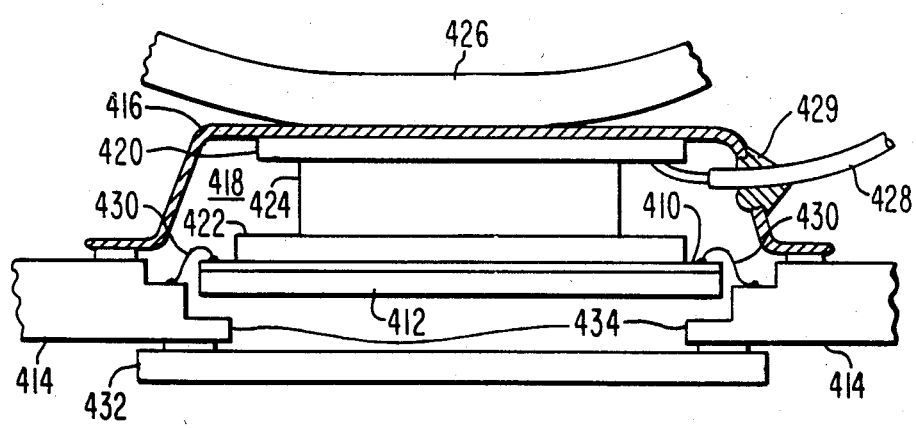
FIG. 4, is a cross-sectional view of a solid-state imager thermally coupled with a thermoelectric cooler.

FIG. 4 is a cross-sectional view of a thinned substrate solid-state imager chip 410 bonded to a thin glass plate 412 and housed in a package including a conventional substrate carrier 414 and a hermetically sealing lid 416. A thermoelectric cooler designated generally as 418 includes an upper thermal bus 420 which bears against the inside of lid 416 and a lower thermal bus 422 which bears against the surface of imager chip 410 which is to be cooled. Semiconductor material 424 coupled between buses 420 and 422 pumps heat from bus 422 towards bus 420 when electrically energized with direct current in accordance with the previously noted Peltier effect. Lid 416 is in thermal contact with thermal bus 420 and a thermally conductive material such as a copper braid 426 is thermally affixed to the top of lid 426 to aid in carrying heat pumped by thermoelectric cooler 418 away from the lid to a thermal heat sink (not shown). An electrical conductor cable 428 passes through a hole in lid 416 to carry the electrical energization current to thermoelectric cooler 418. An expoxy 429 is used to seal the hole in lid 416 after cable 428 is inserted. Electrical connection to imager chip 410 is by bonding wires 430 to pins (not shown) which are part of carrier 414. A light transparent window 432 completes the imager package and is bonded over an opening 434 in carrier 414.

Other embodiments of the invention will be obvious to those skilled in the art. For example, a single thermal servo of the type previously described can be used for controlling the energization of multiple, serial-coupled, thermoelectric coolers for a multiple imager color video camera or a separate thermal servo can be used for each imager. Furthermore, other circuit implementations for the thermal servo could be used. For example, in place of FET 228 of FIG. 2, a pulse width modulator can be used having its pulse width controlled in accordance with the level of the temperature indicating signal of FIG. 1, or with the amplitude of the dark current signal of FIG. 3b. Additionally, alternative temperature sensing devices could be employed. For example, a thermocouple and can be used to provide a temperature-dependent signal. Finally, it may be desirable to cool the imager even when operating the camera in the 0 dB preamplifier gain mode, e.g., when the ambient temperature is substantially greater than room temperature. This would imply the need for an additional temperature sensor to modify the signal to comparator 32 of FIG. 1. Of course, an additional temperature sensor would not be required if the dark current were being directly sensed, as in FIG. 3b.

What is claimed is:

1. A solid-state imager video camera, comprising:
    optical means for imaging light from an illuminated scene;
    a solid-state imager responsive to light imaged by said optical means for developing output signals representative of said scene;
    signal processing means including a gain-controlled amplifier for developing a video signal from said output signals;
    cooling means coupled to said imager for removing heat from said imager;
    thermal servo means coupled to said cooling means for regulating the cooling of said imager to a predetermined point; and
    cooling control means coupled to said thermal servo means for changing said predetermined point of said thermal servo means in accordance with changes in the gain of said gain-controlled amplifier.

2. The camera of claim 1 further including synchronizing means coupled to said thermal servo for synchronizing the regulation of said cooling of said imager with time periods corresponding to the vertical blanking interval of a television field.

3. The camera of claim 1 wherein said predetermined point corresponds to a predetermined temperature.

4. The camera of claim 3 wherein said cooler control means decreases said predetermined temperature when the gain of said gain-controlled amplifier is increased.

5. The camera of claim 4 including a manually operable gain control switch for controlling the gain of said amplifier, said cooler control means being responsive to said gain control switch for changing said predetermined temperature.

6. The camera of claim 4 wherein said signal processing means develops an automatic gain control (AGC) signal for controlling the gain of said amplifier, said cooler control means being responsive to said AGC signal for changing said predetermined temperature.

7. The camera of claim 3 wherein said thermal servo comprises:
    sensing means thermally coupled to said imager for generating a temperature-dependent signal;
    a source of reference signal;
    comparator means coupled to said sensing means and said source of reference signal for generating a control signal representative of the difference between said reference and temperature-dependent signals; and
    drive means coupled to said comparator means and said cooling means for selectively energizing and de-energizing said cooling means for regulating the cooling of said imager.

8. The camera of claim 7 further including synchronizing means coupled to said drive means for synchronzing said selective energization and de-energization of said cooling means to occur within time periods when said ouput signal is not used for generating video signal representative of said scene.

9. The camera of claim 1 wherein said predetermined point corresponds to a given level of temperature-dependent non-scene representative signal component in said imager output signals.

10. The camera of claim 9 wherein said temperature-dependent component substantially comprises dark current signals generated within said imager.

11. A solid-state imager video camera, comprising:
    optical means for imaging light from an illuminated scene;
    a solid-state imager responsive to light imaged by said optical means for developing output signals representative of said scene, said output signals containing a temperature-dependent non-scene representative component which becomes an increased percentage of said output signal in response to a decreased amount of light imaged on said image;
    cooling means coupled to said imager for removing heat from said imager;
    thermal servo means coupled to said cooling means for regulating the cooling of said imager to establish a given maximum amount of temperature-dependent component; and
    cooling control means coupled to said thermal servo means for changing said cooling so as to establish a changed maximum amount of temperature-dependent component from said given amount, in accordance with a changed amount of light imaged on said imager.

12. The camera of claim 11 wherein said cooler control means decreases said maximum amount of temperature-dependent component to be less than said given amount when said amount of light imaged on said imager decreases.

13. A method for operating a thermal servo for cooling a solid-state imager, said method comprising the following sequential steps;
   setting said thermal servo to cool said imager to a predetermined temperature for establishing a maximum percentage of temperature-dependent non-scene representative component in the imager output signal when the amplitude of said imager output signal is at a predetermined level; and
   changing said predetermined temperature to a higher temperature when the amplitude of said imager output signal increases to a level greater than said predetermined level.

14. The method of claim 13 wherein said changing step comprises increasing said predetermined temperature so as to allow said temperature-dependent component to increase with increasing temperature to the point wherein said temperature-dependent component is again said maximum percentage but of said greater level imager output signal.

15. The method of claim 13 wherein said changing step is responsive to a sensitivity setting for said imager for changing said predetermined temperature.

16. A solid-state imager video camera, comprising:
   optical means for imaging light from an illuminated scene;
   a solid-state imager responsive to light imaged by said optical means for developing output signals representative of said scene;
   cooling means coupled to said imager for removing heat form said imager;
   thermal servo means coupled to said cooling means for selectively energizing and de-energizing said cooling means regulating the cooling of said imager to a predetermined point; and
   synchronizing means coupled to said thermal servo for synchronizing said selective energization and de-energization of said cooling means to occur within time periods when said output signal is not used for generating video signal representative of said scene.

17. The camera of claim 16 wherein said time periods correspond to the blanking interval of a television field.

* * * * *